Feb. 8, 1955 J. L. BLAYNEY 2,701,850

AUTOMATIC FOCUS CONTROL FOR CATHODE-RAY TUBES

Filed Feb. 2, 1951

INVENTOR.
JAMES LEONARD BLAYNEY
BY
Brown, Denk & Synnestvedt
AGENTS 2,701,850

AUTOMATIC FOCUS CONTROL FOR CATHODE-RAY TUBES

James Leonard Blayney, Lansdale, Pa., assignor to Philco Corporation, Philadelphia, Pa., a corporation of Pennsylvania Application February 2, 1951, Serial No. 209,159

9 Claims. (Cl. 315—10)

Figures 1, 2, 3:
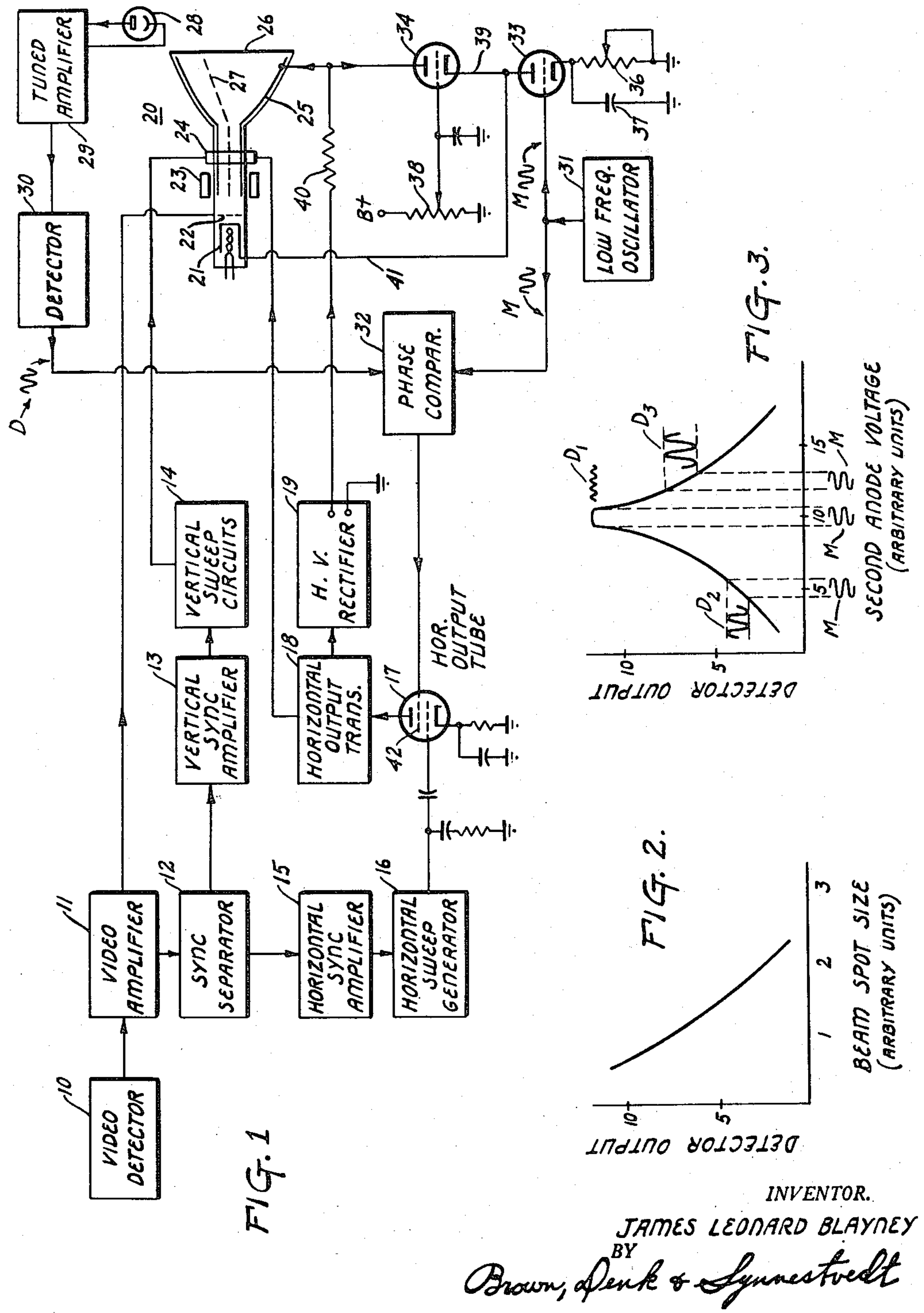

The invention herein described and claimed relates to cathode-ray tubes, and particularly to automatic means for maintaining the cathode-ray beam in sharp focus on the screen of the tube.

While the invention may be employed in any cathode-ray system, it is employable to particular advantage in television and radar systems, since in these systems it is particularly important that the picture seen on the viewing screen have good resolution and sharp detail.

I have discovered that the light output from the fluorescent screen of a cathode-ray tube, at those higher frequency components of the beam-intensity modulating signal which correspond to the fine details of the image, reaches a sharp maximum when the beam is finely focused, and that when the beam spot is increased in size the light output at the higher modulating frequencies decreases very materially.

Accordingly, a broad object of the present invention is to provide, in a cathode-ray system, means responsive to the light output of the fluorescent screen at selected high-modulation frequencies for producing a signal indicative of the focal condition of the beam.

A further object of the present invention is to provide means for utilizing the above-mentioned signal as a control signal to oppose departure of the beam from sharp focus, thereby to maintain the beam finely focused.

In accordance with a preferred embodiment of the invention, the foregoing objects are achieved by providing a photoelectric cell responsive to the light output from the fluorescent screen of the cathode-ray tube, and applying the output of the photo-cell to a device tuned to a high-frequency component of the beam-intensity modulating signal. The output of the tuned device is then indicative of the light output of the fluorescent screen at the selected high modulation frequency, and, in accordance with my discovery, is indicative of the focal condition of the beam. To utilize the output of the tuned device to change the beam focus in the proper direction, i. e. toward sharper focus, means are provided for modulating the focus in an oscillatory manner at a low-frequency rate, thereby to cause the output of the tuned device to be modulated at the same low-frequency rate. The phase of the modulated output signal relative to the phase of the applied modulating signal is dependent upon the focal condition of the beam, and, hence, furnishes the necessary indication as to whether the beam is under-focused or over-focused. Means are, therefore, provided responsive to the phase of the modulated output signal to change the focus in such direction as to produce sharp focus.

The present invention will be best understood from a consideration of the following detailed description taken together with the accompanying drawing in which:

Figure 1 is a largely diagrammatic but partly schematic representation showing a preferred embodiment of the present invention incorporated in a television receiver; and Figures 2 and 3 are graphical representations which will be helpful in explaining and understanding the invention.

It should be understood that while I have chosen to illustrate the use of my invention in a television receiver, the invention may, as previously stated, also be used to advantage in radar or other cathode-ray systems.

Referring now to Figure 1, I have illustrated that portion of a television receiver which includes the video detector 10, video amplifier 11, synchronizing separator circuit 12, vertical synchronizing amplifier 13, vertical sweep circuits 14, horizontal synchronizing amplifier 15, horizontal sweep generator 16, horizontal output tube 17, horizontal output transformer 18, high-voltage rectifier 19 and cathode-ray tube 20. Cathode-ray tube 20 includes cathode 21, control grid 22, permanent focusing magnet 23, vertical and horizontal deflection coils 24, second anode 25 and fluorescent screen 26. The dotted line 27 represents the cathode-ray beam. The components mentioned thus far are entirely conventional and need not be described in detail.

In accordance with the present invention, a light-sensitive device, as for example, a photoelectric cell 28, is mounted in a suitable position to receive a portion of the light emitted from the fluorescent screen 26, preferably from the entire surface of the fluorescent screen. The output of the photoelectric cell 28 is applied to a high-gain amplifier 29 tuned to a frequency which correspond to a fine-detail component of the video signal. For example, in a conventional black-and-white 525-line television receiver in which the fluorescent screen is scanned at a line frequency of 15,750 cycles per second and a frame frequency of 30 cycles per second, the three-megacycle component of the video signal may be deemed to be a fine-detail component, and, accordingly, amplifier 29 may be sharply tuned to three megacycles. The output of tuned amplifier 29 is applied to detector 30 where the signal is rectified and averaged, preferably over at least one frame of picture information.

In Figure 2, I have shown graphically the manner in which, when beam 27 is being deflected over the surface of the fluorescent screen 26 in a predetermined scanning pattern, the light output at the selected fine-detail component of the video signal, as evidenced by the output of detector 30, varies as the size of the scanning spot is varied. Note that the output is large when the beam spot is small, and that, as the size of the beam spot is increased, the output decreases. The explanation is, of course, that as the scanning spot is increased in size the beam becomes less and less able to paint a picture having fine details and sharp delineations, and consequently the light output at the higher modulation frequencies, corresponding to the fine-detail video information, becomes smaller and smaller.

Since the scanning spot may be larger than minimum size either because the beam is under-focused or over-focused, it is necessary, or at least desirable, to provide means capable of determining automatically the direction of the departure, if any, of the beam from sharp focus. This may be accomplished by varying the focus of the beam in an oscillatory manner at a low-frequency rate whereby the focus swings back and forth through sharp focus, the excursions not being sufficient to be discernible to the eye of the observer but sufficient to be detected electronically.

If the cathode-ray system is equipped with a focusing coil, the beam focus may be conveniently varied by means similar to that shown and described in U. S. patent to Mankin, 2,472,165, issued June 7, 1949. The present trend, however, is toward the use of a permanent magnet type of focusing device in which case it is more convenient to vary the focus by varying the second anode voltage, and, in the circuit of Figure 1, such means are shown.

In Figure 1, the low-frequency oscillator 31, the phase comparator 32, and certain other components which will be described, constitute the means employed to vary the second anode voltage, thereby to vary the beam focus. Oscillator 31 generates an oscillatory modulation signal M of predetermined low frequency, preferably lower than the frame scanning frequency. Signal M is applied to phase comparator 32 and also to the second anode 25 by way of a suitable circuit which, in Figure 1, includes triodes 33 and 34 and associated circuit elements.

Triode 34 is a regulator tube which functions to prevent variations in the second anode voltage of picture tube 20 due to changes in the average cathode-ray beam current caused by variations in the D.-C. component of the video signal applied to the grid of the picture tube.

The manner in which tube 34 functions to regulate the second anode voltage may be briefly described as follows:

Assume that triode 33 (which is added for the express purpose of varying the second anode voltage to accomplish the objects of the present invention) has not yet been added to the circuit and that cathode 39 of regulator tube 34 is connected to ground by way of a cathode-load impedance network comprising resistor 36 and video bypass capacitor 37. Cathode 39 is, accordingly, at ground potential so far as video frequencies are concerned. The load current drawn from the high-voltage rectifier 19 by the picture tube 20 may be traced through a circuit comprising resistor 40, second anode 25, cathode-ray beam 27, cathode 21, conductor 41, and thence, so far as the D.-C. or slowly varying components of the video signal are concerned, to ground through the cathode-load resistor 36. Observe that the total current through cathode-load resistor 36 is the sum of the direct or low-frequency currents drawn from the high-voltage rectifier 19 by the cathode-ray tube 20 and the regulator tube 34 connected in parallel. Since regulator tube 34 operates as a cathode follower, the voltage drop across the cathode-load resistor 36 tends to remain substantially equal to the signal applied to the grid of tube 34. But the signal applied to the grid of tube 34 is a fixed or constant voltage whose value is determined by the setting of resistor 38. Hence, the voltage drop across cathode-load resistor 36 tends to remain substantially constant, irrespective of variations in the D.-C. component of the current drawn by the cathode-ray tube 20. In other words, when the D.-C. component of the load current drawn by picture tube 20 varies in accordance with variations in the average-illumination components of the applied video signal, the current drawn by regulator tube 34 varies in an opposite or complementary manner, and the sum of the two currents, which is the current through the cathode-load resistor 36, remains substantially constant. Since the total current through cathode-load resistor 36 is also the total current flowing through resistor 40, the voltage drop across resistor 40 and, hence, the potential of the second anode 25 remain substantially constant. This assumes, of course, that the high voltage developed in rectifier 19 and the B+ voltage applied to the grid of the regulator tube 34 remain constant.

To vary the second anode voltage at a low-frequency rate, thus to vary the focus of beam 27 in a corresponding manner for the purpose of accomplishing the objects of the present invention, a triode 33 may be conveniently inserted between cathode 39 of regulator tube 34 and the cathode-load resistor 36. Then, by applying signal M from oscillator 31 to the grid of tube 33, the current through the cathode-load resistor 36 and the second-anode voltage may both be varied in accordance with the applied signal M. And, as a result, the beam focus is varied in a corresponding manner. The photoelectric cell 28 responds to the low-frequency oscillatory variations in the light output of the screen 26, and the high-frequency output of tuned amplifier 29 is modulated at the frequency of the signal M. The effect of this low-frequency modulation upon the rectified signal delivered by detector 30 will be most readily understood by considering the graphical representation given in Figure 3.

In Figure 3, I have shown the manner in which the output of detector 30 varies as a function of second anode voltage, the effect of modulating the second anode being clearly depicted. To facilitate the description, the value of second anode voltage at which the output of detector 30 is maximum is, in Figure 3, assumed to be ten units, the value of the unit being purely arbitrary. This is the value, then, of second anode voltage at which the beam is sharply focused. When, in Figure 3, the second anode voltage differs from ten units, the beam is either under-focused or over-focused.

The low-frequency modulating signal M applied in the manner hereinbefore described to vary the second anode voltage is also depicted graphically in Figure 3. It will be seen that if the second anode be modulated by the signal M when the steady value of second anode voltage is less than ten units (corresponding to an over-focused condition) the rectified output of detector 30 will have an alternating component $D_2$ which is in phase with the modulating signal M. If, however, the second anode is modulated by the signal M when the steady value of anode voltage is greater than ten units (corresponding to an under-focused condition) the alternating component $D_3$ of the detector output will be out-of-phase with the modulating signal M. Hence, by comparing the phase of the alternating component of the rectified output of detector 30 with the phase of the signal M generated by low-frequency oscillator 32, a determination may be made as to whether the beam is under-focused or over-focused.

It will be understood from Figure 3 that if the modulating voltage M is applied when the steady value of the second anode voltage is ten units (corresponding to sharp focus) the alternating component $D_1$ in the output of detector 30 will be of negligible amplitude.

While the phase comparator 32 shown diagrammatically in Figure 1 may be of any suitable type, it may conveniently take the form shown and described in the previously-mentioned U. S. patent to Mankin, 2,472,165. As therein explained, the phase comparator develops a D.-C. signal whose polarity and magnitude are dependent upon the direction and extent of the departure of the beam from sharp focus. Hence, the D.-C. signal developed in the phase comparator may be utilized to control automatically the focus of the beam.

While the magnitude of the D.-C. signal developed by the phase comparator is, as has just been stated, dependent upon the extent of the departure, it is not necessarily a direct function thereof. The curve shown in Figure 3 is, of course, idealized. Nevertheless, the curve correctly depicts the fact that the detector output rises quite sharply as the beam approaches sharp focus. Hence, the magnitude of the D.-C. signal developed in the phase comparator will be larger when the departure from sharp focus is very small than when it is large. Accordingly, it appears that as the beam is moved toward sharp focus by the action of the control circuit, the control signal increases in magnitude and that as a result the beam tends to snap sharply into the optimum focal condition.

With respect now to the manner in which the signal developed by phase comparator 32 may be employed to maintain the beam in sharp focus. If the cathode-ray tube whose focus is to be controlled has a focusing coil, the beam focus may be controlled by varying the focusing current in the manner shown and described in U. S. Patent 2,472,165, previously mentioned. If, on the other hand, the cathode-ray tube has a focus device of the permanent magnet type, the focus of the beam may be most conveniently controlled by controlling the potential of the second anode. In the circuit of Figure 1, this is done by applying the D.-C. control signal developed by phase comparator 32 to the screen grid 42 of the horizontal output tube 17 to vary the gain of the tube, thereby to vary the amplitude of the deflection wave applied to horizontal output transformer 18, and thereby to control the magnitude of the voltage developed in high-voltage rectifier 19 and applied to the second anode 25. Phase comparator 32 is so arranged that, when the control signal developed therein is zero, the normal screen grid biasing voltage is applied to grid 42.

It should be understood that the range throughout which the second anode voltage is required to be varied in order to control the beam focus is relatively small compared with the second anode voltage. For example, whereas the second anode voltage may be of the order of from fifteen to twenty thousand volts, I have found that a variation range of ±600 volts is adequate for beam-focus control. Such a variation may be accomplished by varying the horizontal sweep output to such a small extent that the effect upon beam deflection is substantially unnoticeable.

It will be understood that the means hereinabove described for modulating, and for controlling, the second anode voltage are merely examples of convenient means, and that other means for modulating and controlling the second anode voltage may be used, if desired.

I wish to point out that I have found the operation of the focus-control system of the present invention to be substantially independent of picture content.

It will be seen from the foregoing description that I have provided a control system which operates to automatically maintain the beam at, or bring the beam to, a condition of focus which produces maximum light output at frequencies corresponding to the fine-detail or sharp-delineation components of the video or other beam-intensity modulating signal, and that such a condition of focus corresponds to sharp focus.

Having described my invention, I claim:

1. In a cathode-ray system comprising a cathode-ray tube having means for generating an electron beam, a fluorescent screen, means for deflecting said beam to scan said screen, means for modulating the intensity of said beam with a signal having a high-frequency component, a second anode, a controllable source of second anode potential, means responsive to variations in the light output of said screen at the frequency of said high-frequency component, thereby to develop a signal indicative of the focal condition of said beam, and means responsive to said developed signal for controlling said second anode potential, thereby to control the focus of said beam.

2. Apparatus as claimed in claim 1 characterized by the fact that said controllable source of second anode potential comprises a source of deflection signal and a rectifier responsive to said deflection signal for developing a high voltage for application to said second anode, and further characterized by the fact that said control signal is employed to control the magnitude of said deflection signal.

3. In a cathode-ray system: a cathode-ray tube having a beam source; a fluorescent screen; means for deflecting said beam to scan said screen; means for modulating the intensity of said beam with a signal having a high-frequency component; and means responsive to variations in the light output of said screen at the frequency of said high-frequency component for developing a signal indicative of the focal condition of said beam, said responsive means including a photoelectric cell, an amplifier tuned to the said frequency of said high-frequency component, and means for applying the output of said photoelectric cell to said amplifier.

4. In a cathode-ray system: a cathode-ray tube having means for generating an electron beam; a fluorescent screen; means for deflecting said beam to scan said screen; means for modulating the intensity of said beam with a signal having a high-frequency component; means responsive to variations in the light output of said screen at the frequency of said high-frequency component for developing a signal indicative of the focal condition of said beam, said responsive means including a photoelectric cell, an amplifier tuned to the said frequency of said high-frequency component, and means for applying the output of said photoelectric cell to said amplifier; and means responsive to said developed signal for controlling the beam focus.

5. In a cathode-ray system: a cathode-ray tube having a beam source; a fluorescent screen; means for deflecting said beam to scan said screen; means for modulating the intensity of said beam with a signal of sufficiently high frequency to produce variations in light output at said high frequency as a function of variations in beam focus; and means responsive to variations in the light output of said screen at the frequency of said high-frequency component for developing a signal indicative of the focal condition of said beam.

6. Apparatus as claimed in claim 5 characterized in that means are provided responsive to said developed signal for controlling the beam focus.

7. Apparatus as claimed in claim 5 characterized in that means are provided for varying the focus of said beam at a low frequency to cause said developed signal to vary in phase depending upon the direction of de-focus.

8. Apparatus as claimed in claim 7 characterized in that means are provided for using said developed signal to change the focus in a direction determined by the phase of said developed signal.

9. In a cathode-ray system: a cathode-ray tube having a beam source; a fluorescent screen; means for deflecting said beam to scan said screen; means for modulating the intensity of said beam with a signal representing intelligence to be presented in visual form, said intelligence signal having high-frequency components representing sharp delineations of the said visual presentation; and means responsive to variations in the light output of said screen at the frequencies of said high-frequency components for developing a signal indicative of the focal condition of said beam.

References Cited in the file of this patent

UNITED STATES PATENTS

| | | |
|---|---|---|
| 2,047,533 | Von Ardenne | July 14, 1936 |
| 2,075,140 | Schlesinger | Mar. 30, 1937 |
| 2,188,679 | Dovaston et al. | Jan. 30, 1940 |
| 2,457,911 | Munster | Jan. 4, 1949 |
| 2,458,291 | Munster et al. | Jan. 4, 1949 |
| 2,472,165 | Mankin | June 7, 1949 |
| 2,571,306 | Szegho | Oct. 16, 1951 |